(12) United States Patent
Murray

(10) Patent No.: US 12,128,659 B2
(45) Date of Patent: Oct. 29, 2024

(54) PAPER LAMINATE PLASTIC VIAL

(71) Applicant: Pouch Pac Innovations, LLC, Sarasota, FL (US)

(72) Inventor: R. Charles Murray, Sarasota, FL (US)

(73) Assignee: Pouch Pac Innovations, LLC, Sarasota, FL (US)

(*) Notice: Subject to any disclaimer, the term of this patent is extended or adjusted under 35 U.S.C. 154(b) by 0 days.

(21) Appl. No.: 18/082,821

(22) Filed: Dec. 16, 2022

(65) Prior Publication Data

US 2023/0191765 A1 Jun. 22, 2023

Related U.S. Application Data

(60) Provisional application No. 63/290,162, filed on Dec. 16, 2021.

(51) Int. Cl.
*B32B 29/00* (2006.01)
*B32B 15/12* (2006.01)
*B32B 15/20* (2006.01)
*B32B 27/10* (2006.01)
*B32B 27/30* (2006.01)

(52) U.S. Cl.
CPC ............ *B32B 29/002* (2013.01); *B32B 15/12* (2013.01); *B32B 15/20* (2013.01); *B32B 27/10* (2013.01); *B32B 27/306* (2013.01); *B32B 2250/03* (2013.01); *B32B 2307/732* (2013.01); *B32B 2439/40* (2013.01)

(58) Field of Classification Search
CPC ....... B32B 15/08; B32B 15/085; B32B 15/20; B32B 29/002; B32B 29/005; B32B 27/306; B32B 2250/03; B32B 2307/732; B32B 2439/40; B65D 75/326; B65D 75/327
See application file for complete search history.

(56) References Cited

U.S. PATENT DOCUMENTS

| | | | | |
|---|---|---|---|---|
| 4,498,591 A | * | 2/1985 | Smith, II | B65D 33/007 383/906 |
| 2018/0319559 A1 | * | 11/2018 | Toft | B32B 29/08 |
| 2021/0107263 A1 | * | 4/2021 | Bartolucci | B32B 27/36 |

* cited by examiner

*Primary Examiner* — Catherine A. Simone
(74) *Attorney, Agent, or Firm* — Fishman Stewart PLLC

(57) ABSTRACT

A laminate vial includes a first laminate sheet including an outer paper layer and a middle barrier layer joined with the outer layer, the middle barrier layer joined with an inner layer formed of a plastic material. Also included is a second laminate sheet including an outer paper layer and a middle barrier layer joined with the outer layer, the middle barrier layer joined with an inner layer formed of a plastic material. The first laminate sheet is joined to the second laminate sheet to define a seal and a cavity. Recycled materials may be used in all of the layers of the laminate.

20 Claims, 6 Drawing Sheets

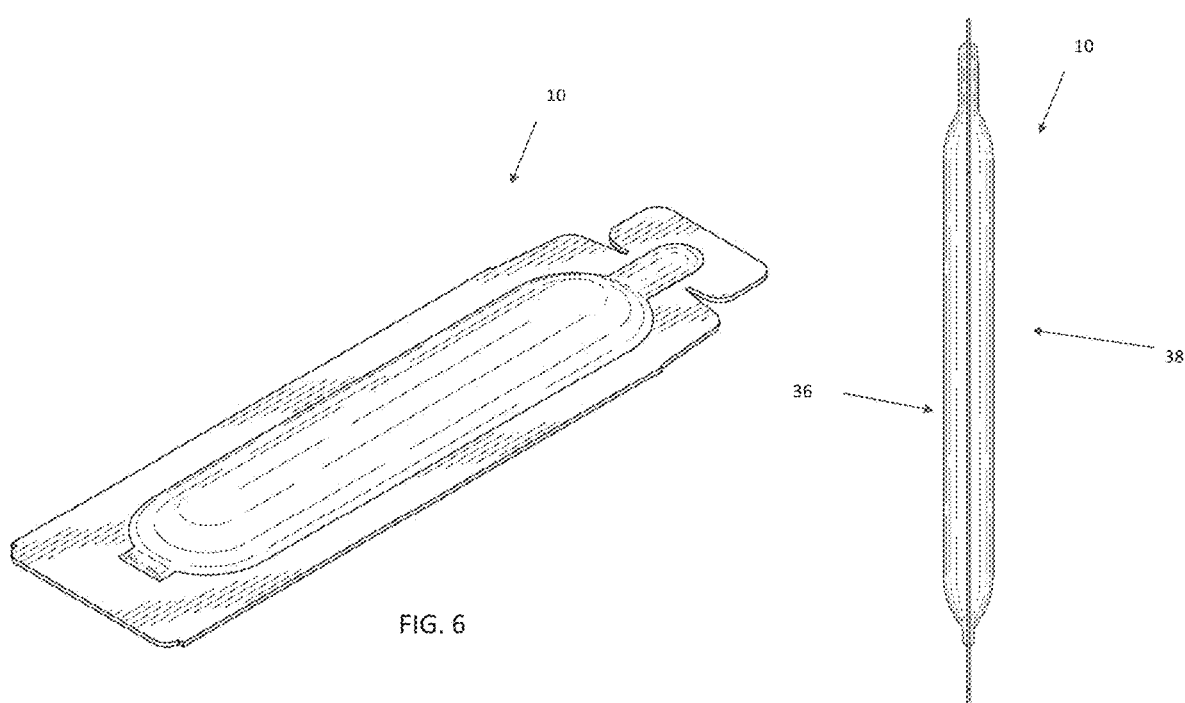

PAPER LAMINATE PLASTIC VIAL

FIELD OF THE INVENTION

The invention relates to plastic vials and more particularly to an opening mechanism for vials molded from plastic sheets.

BACKGROUND OF THE INVENTION

It is known to form plastic vials from two overlaid sheets of plastic material. The vial has a profile of the little shape molded into the center with a peripheral planar portion extending around the profile. The profile generally has a bottom cylindrical portion with an upper spout portion which is used to dispense the contents in the spout.

Due to concerns about the recycling of such vials, it would be desirable to have vials made of recycled materials or of materials that may be easily recycled.

SUMMARY OF THE INVENTION

In one aspect, there is disclosed a laminate vial including a first laminate sheet including an outer paper layer and a middle barrier layer joined with the outer layer, the middle barrier layer joined with an inner layer formed of a plastic material. Also included is a second laminate sheet including an outer paper layer and a middle barrier layer joined with the outer layer, the middle barrier layer joined with an inner layer formed of a plastic material. The first laminate sheet is joined to the second laminate sheet to define a seal and a cavity.

In another aspect, there is disclosed a laminate vial including a first laminate sheet including an outer paper layer and a middle barrier layer of aluminum joined with the outer layer, the middle barrier layer joined with an inner layer formed of EVOH/LLDPE. Also included is a second laminate sheet an outer paper layer and a middle barrier layer of aluminum joined with the outer layer, the middle barrier layer joined with an inner layer formed of EVOH/LLDPE. The first laminate sheet is joined to the second laminate sheet to define a seal and a cavity.

In a further aspect, there is disclosed a laminate vial including a first laminate sheet including an outer recycled paper layer and a middle barrier layer of recycled aluminum joined with the outer layer, the middle barrier layer joined with an inner layer formed of recycled EVOH/LLDPE. Also included is a second laminate sheet an outer recycled paper layer and a middle barrier layer of recycled aluminum joined with the outer layer, the middle barrier layer joined with an inner layer formed of recycled EVOH/LLDPE. The first laminate sheet is joined to the second laminate sheet to define a seal and a cavity.

BRIEF DESCRIPTION OF THE DRAWINGS

FIG. 6 is a perspective view of a flexible vial pouch according to an embodiment of the present invention.

DETAILED DESCRIPTION OF THE PREFERRED EMBODIMENTS

Figure 1:
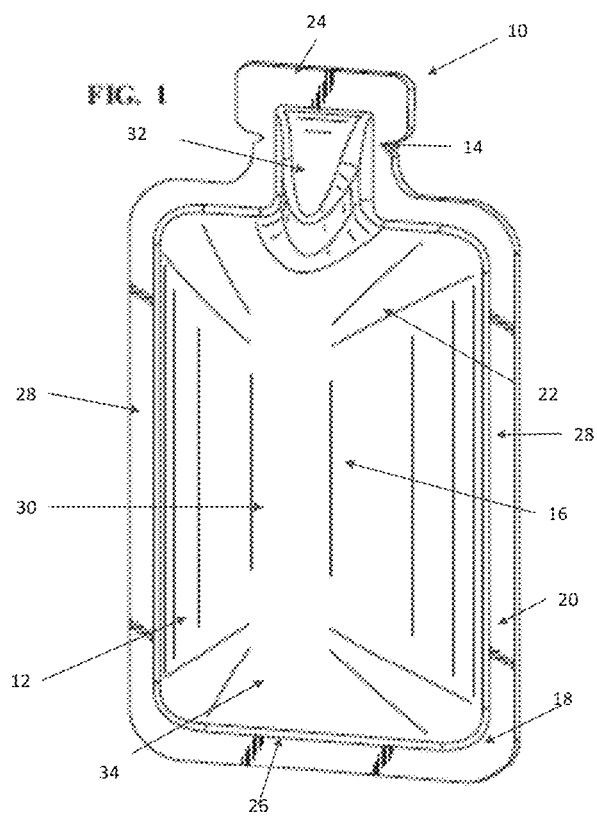
FIG. 1 is a perspective view of a flexible vial pouch according to an embodiment of the present invention.
Figure 2:
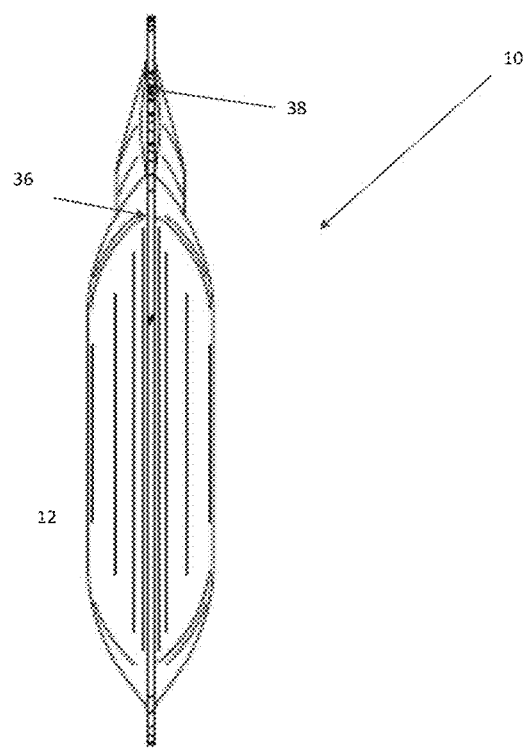
FIG. 2 is a side view of the embodiment shown in FIG. 1.

A novel vial 10 for containing squeezable, highly viscous, or semisolid material is shown in FIGS. 1-2. The vial 10 has a cavity 12 to hold materials such as lotions or gels or other viscous products. The vial 10 has a notch or opening 14 to permit the vial to open to dispense the contents 16. The vial 10 has a body 18 including a front side which has a peripheral planar portion 20 extending around a central shaped raised portion 22. The raised portion defines the cavity 12 for holding the contents of the vial and the peripheral portion 20 defines a seal.

The body has a top 24, bottom 26 and a pair of sides 28. The raised portion 22 extends outwardly in both directions from the planar portion 20 to form a cylindrical portion 30 and a spout portion 32. The cylindrical portion 30 has a bottom wall 34.

As shown in FIG. 2, the body 18 is formed by joining two laminate sheets 36, 38 at the peripheral portion 20. The two sheets may be joined by a heat seal, ultrasonic seal or other sealing operation. The notch 14 extends from one side 28 across the planar portion 20.

Figure 4:
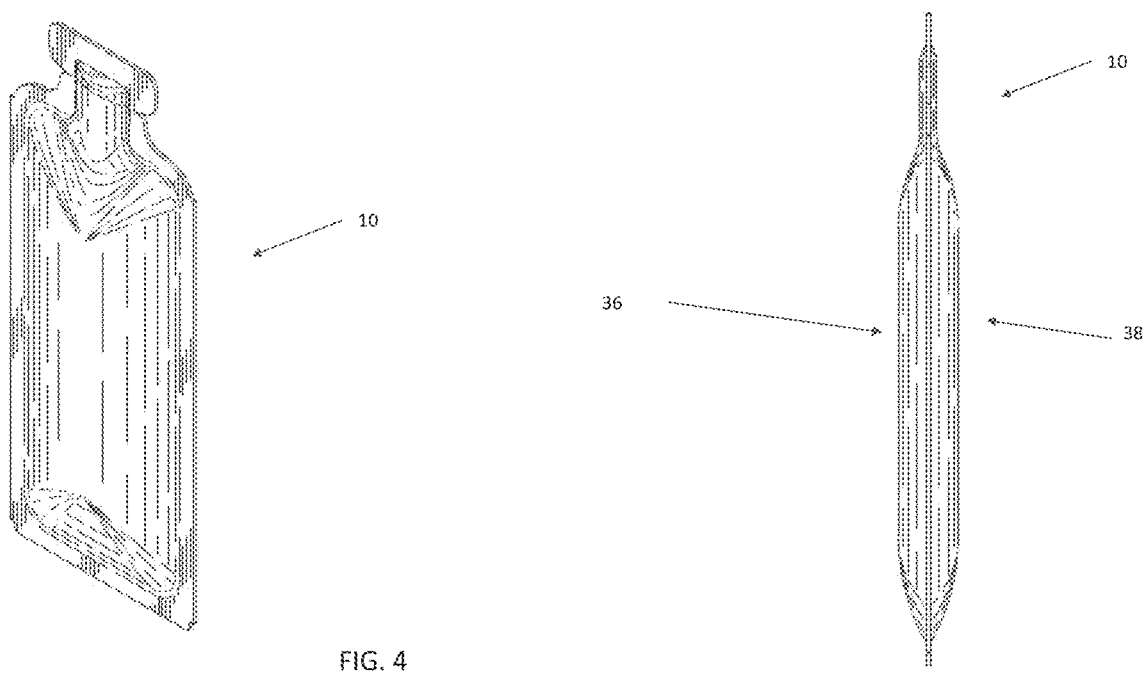
FIG. 4 is a perspective view of a flexible vial pouch according to an embodiment of the present invention.
Figure 5:
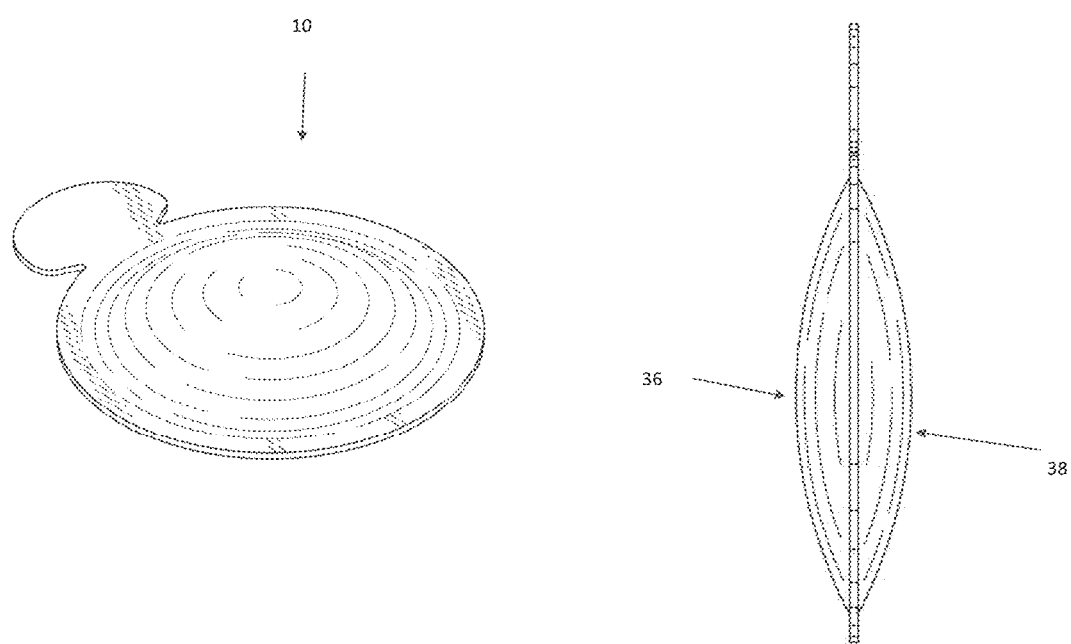
FIG. 5 is a perspective view of a flexible vial pouch according to an embodiment of the present invention.

It should be realized that various shapes of vials may be used such as shown in FIGS. 4-6. The shapes include rectangular and round shapes. The vial may include a bottom gusset or other structure.

Figure 3:
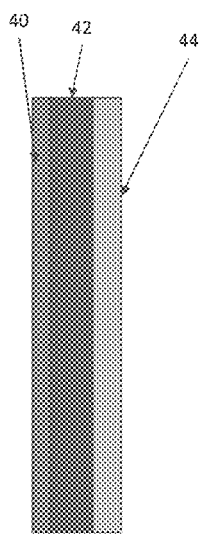
FIG. 3 is a partial sectional view showing a laminate structure.

The laminate, as shown in FIG. 3, includes paper as the outermost layer 40. The paper may be a virgin paper product or a recycled paper product. In one aspect, the paper may have a thickness of from 90 to 110 μm. The paper may be printable such that a brand logo or other indicia may be included on the outer layer 40. When the outer layer 40 is formed of recycled paper, the recycled paper is subjected to an embossing operation to increase the strength characteristics of the outer layer 40. In one aspect, the recycled paper may be embossed using embossment rollers that impart fines lines to the paper. In one aspect the embossment lines may be spaced from each other in an amount of 0.5 mm or less. Such a spacing provides a desired strength to the outer layer 40.

The laminate includes a middle layer 42. The middle layer may serve as a barrier layer preventing egress of air or materials into the vial 10. The middle layer may also serve as a structural layer providing strength to the vial 10. Various materials may be utilized as a middle layer material. Included middle layer materials include: aluminum foil, ethylene vinyl alcohol copolymer (EVOH), polyester, and polyethylene terephalate (PET) and polypropylene (PP). Additionally Silicon dioxide ($SiO_2$) and Titanium dioxide $TiO_2$ may be utilized in both virgin and recycled form. Various combinations of the listed materials may be utilized as the middle layer 42. In one aspect, the middle may have a thickness of from 180 to 280 μm. In another aspect, the middle layer may be formed from recycled aluminum and recycled plastic materials. The recycled content may be from 50% to 100% recycled materials.

The laminate includes an inner layer 44. The inner layer may include various materials such as ethylene vinyl alcohol copolymer (EVOH) and polyethylene (PE). A particularly useful PE includes linear low density polyethylene (LLDPE) used as a sealant. In one aspect, the inner layer may have a thickness of from 40 to 60 μm. In another aspect, the inner layer may be formed from recycled plastic materials. The recycled content may be from 50% to 100% recycled materials.

Various examples of laminate structures are provided in the table below:

| Outer layer | Middle layer | Inner layer |
| --- | --- | --- |
| Virgin paper (100 μm) | PET (250 μm) | EVOH/LLDPE (50 μm) |
| Recycled paper (100 μm) | PET (250 μm) | EVOH/LLDPE (50 μm) |
| Recycled paper (100 μm) | Al (200 μm) | EVOH/LLDPE (50 μm) |
| Virgin paper (100 μm) | Al (200 μm) | EVOH/LLDPE (50 μm) |
| Recycled paper (100 μm) | Recycled Al (200 μm) | EVOH/LLDPE (50 μm) |
| Recycled paper (100 μm) | Recycled Al (200 μm) | Recycled EVOH/LLDPE (50 μm) |
| Recycled paper (110 μm) | Recycled Al (180 μm) | Recycled EVOH/LLDPE (40 μm) |
| Recycled paper (90 μm) | SiO2 (280 μm) | Recycled EVOH/LLDPE (60 μm) |
| Recycled paper (100 μm) | SiO2 (200 μm) | EVOH/LLDPE (50 μm) |
| Recycled paper (100 μm) | TiO2 (200 μm) | EVOH/LLDPE (50 μm) |

It should be realized that various thickness and types of paper, thickness and types of barrier layers and thickness and type of inner layers as described above may be utilized. In one aspect, the laminate may include sealants applied to the various layers to bond the layers together. Sealants that may be utilized include laminate film sheet adhesives that melt at around 150 degrees C.

The laminate results in a relatively soft sheet material. The sheets are flexible and thin. However when the cavity is filled and sealed, the air in the spout is compressed to make the raised profile rigid. Thus, it is possible to grasp on the top 24 of the vial to open the vial at the notch 14 across the spout 32. Once opened, the raised profile 22 becomes flexible allowing the user to easily control dispensing of the contents 16 with pressure on the cylindrical portion 30 to force the contents 16 out of the spout 32 in a desired quantity.

The novel vial provides for a completely or partially recycled material content to meet the demands of sustainable materials to reduce waste burdens and maintains a desired material within the vial. The vial has use especially in single use applications such as individual portions of soap, shampoo, condiments and other common single dose packages. The novel vial does not leak and maintains the desired product in the vial.

The invention claimed is:

1. A laminate vial, comprising:
a first laminate sheet including a first outer paper layer formed of a first paper, a first middle barrier layer joined with the first outer paper layer, and a first inner layer formed of a first plastic material and joined with the first middle barrier layer; and
a second laminate sheet including a second outer paper layer formed of a second paper, a second middle barrier layer joined with the second outer paper layer, and a second inner layer formed of a second plastic material and joined with the second middle barrier layer;
wherein the first laminate sheet is joined to the second laminate sheet to define a seal and a cavity;
wherein at least one of the first paper and the second paper includes a plurality of embossment lines; and
wherein adjacent embossment lines of the plurality of embossment lines are disposed spaced apart from one another by 0.5 mm or less.

2. The laminate vial of claim 1, wherein the first paper and/or the second paper is recycled paper.

3. The laminate vial of claim 1, wherein the first middle barrier layer and/or the second middle barrier layer is formed of a material selected from a group consisting of: aluminum, recycled aluminum, SiO2, TiO2, EVOH, recycled SiO2, recycled TiO2, and recycled EVOH.

4. The laminate vial of claim 1, wherein the first outer paper layer and/or the second outer paper layer has a thickness of 90 to 110 μm.

5. The laminate vial of claim 1, wherein the first middle barrier layer and/or the second middle barrier layer has a thickness of 180 to 280 μm.

6. The laminate vial of claim 1, wherein the first inner layer and/or the second inner layer has a thickness of 40 to 60 μm.

7. The laminate vial of claim 1, further comprising a sealant joining at least the first outer paper layer, the first middle barrier layer, and the first inner layer.

8. The laminate vial of claim 1, wherein the first middle barrier layer and/or the second middle barrier layer is formed of recycled aluminum.

9. The laminate vial of claim 1, wherein the first plastic material and/or the second plastic material includes (i) ethylene vinyl alcohol copolymer (EVOH) and (ii) a polyethylene (PE).

10. The laminate vial of claim 9, wherein:
the EVOH is recycled EVOH; and
the PE is recycled PE.

11. The laminate vial of claim 9, wherein the PE is linear low density polyethylene (LLDPE).

12. The laminate vial of claim 11, wherein:
the EVOH is recycled EVOH; and
the LLDPE is recycled LLDPE.

13. A laminate vial, comprising:
a first laminate sheet including (i) a first outer layer formed of a first paper, (ii) a first middle barrier layer formed of recycled aluminum, and (iii) a first inner layer formed of EVOH/LLDPE and joined with the first middle barrier layer; and
a second laminate sheet including (i) a second outer layer formed of a second paper, (ii) a second middle barrier layer formed of recycled aluminum, and (iii) a second inner layer formed of EVOH/LLDPE and joined with the second middle barrier layer;
wherein the first laminate sheet is joined to the second laminate sheet to define a seal and a cavity.

14. The laminate vial of claim 13, wherein the first paper and/or the second paper is a recycled paper.

15. The laminate vial of claim 14, wherein the recycled paper is embossed such that the first outer layer and/or the second outer layer includes a plurality of embossment lines that are disposed spaced apart from one another by 0.5 mm or less.

16. The laminate vial of claim 13, wherein the first outer layer and/or the second outer layer has a thickness of 90 to 110 μm.

17. The laminate vial of claim 13, wherein the first middle barrier layer and/or the second middle barrier layer has a thickness of 180 to 280 μm.

18. The laminate vial of claim 13, wherein the first inner layer and/or the second inner layer has a thickness of 40 to 60 μm.

19. The laminate vial of claim 13, wherein the EVOH/LLDPE of the first inner layer and/or the EVOH/LLDPE of the second inner layer is recycled EVOH/LLDPE.

20. A laminate vial, comprising:
a first laminate sheet including an outer layer formed of recycled paper, a middle barrier layer formed of recycled aluminum, the middle barrier layer joined with an inner layer formed of recycled EVOH/LLDPE; and a second laminate sheet including an outer layer formed of recycled paper, a middle barrier layer formed of recycled aluminum, the middle barrier layer joined with an inner layer formed of recycled EVOH/LLDPE;

wherein the first laminate sheet is joined to the second laminate sheet to define a seal and a cavity.

* * * * *